United States Patent
Juillard (10) Patent No.: US 8,615,548 B1
(45) Date of Patent: Dec. 24, 2013

(54) SYSTEM AND METHOD FOR DEFERRED DATA DOWNLOADING

(75) Inventor: Loic Juillard, Escondido, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 902 days.

(21) Appl. No.: 12/686,312

(22) Filed: Jan. 12, 2010

Related U.S. Application Data (63) Continuation-in-part of application No. 12/636,918, filed on Dec. 14, 2009, which is a continuation-in-part of application No. 12/619,882, filed on Nov. 17, 2009, now Pat. No. 8,140,647.

(51) Int. Cl.
*G06F 15/16* (2006.01)

(52) U.S. Cl.
USPC .......................... 709/203; 709/223; 709/224

(58) Field of Classification Search
USPC ....................................................... 709/203
See application file for complete search history.

(56) References Cited

U.S. PATENT DOCUMENTS

| | | | |
|---|---|---|---|
| 7,565,422 B2 * | 7/2009 | Campbell et al. ............. | 709/223 |
| 7,702,781 B2 * | 4/2010 | Devolites ..................... | 709/224 |
| 2003/0200436 A1 * | 10/2003 | Eun et al. ..................... | 713/172 |
| 2004/0107143 A1 * | 6/2004 | Niemi .............................. | 705/26 |
| 2005/0193094 A1 * | 9/2005 | Robbin et al. ................ | 709/219 |
| 2005/0203959 A1 * | 9/2005 | Muller et al. ............... | 707/104.1 |
| 2007/0162579 A1 * | 7/2007 | Lawrence et al. ............. | 709/223 |
| 2008/0244721 A1 * | 10/2008 | Barrus et al. ..................... | 726/9 |
| 2008/0270578 A1 * | 10/2008 | Zhang et al. .................. | 709/219 |
| 2009/0138946 A1 * | 5/2009 | Schneider et al. ................ | 726/5 |
| 2009/0276840 A1 * | 11/2009 | Cao et al. .......................... | 726/9 |
| 2010/0005138 A1 * | 1/2010 | Manzano ..................... | 709/203 |
| 2010/0222139 A1 * | 9/2010 | Wang ............................. | 463/29 |
| 2010/0251352 A1 * | 9/2010 | Zarchy et al. ..................... | 726/9 |
| 2011/0023069 A1 * | 1/2011 | Dowens .......................... | 725/61 |

* cited by examiner

*Primary Examiner* — Waseem Ashraf
(74) *Attorney, Agent, or Firm* — Turocy & Watson, LLP (57) ABSTRACT

A system and method are provided for downloading data to a client device by deferral to an on-line storage device. A client sends a login request to a network-connected remote service device, and receives a remote service identification (ID) from the remote service device. The client sends a token request message, with the remote service ID, to a network-connected on-line storage device, and receives a first token identification (ID) associated with a first session and an on-line storage ID from the on-line storage device. The client sends an upload request message to the remote service device. The upload request message includes the first token ID and on-line storage ID, and identifies a first file to be uploaded to the on-line storage device. Subsequent to the on-line storage device receiving the first file from the remote service device, the client downloads the first file from the on-line storage device.

20 Claims, 5 Drawing Sheets

SYSTEM AND METHOD FOR DEFERRED DATA DOWNLOADING

RELATED APPLICATIONS

This application is a Continuation-in-Part of a pending application entitled, SYSTEM AND METHOD FOR SYSTEM AND METHOD FOR TRANSPARENTLY ACCELERATING DATA UPLOADING, invented by Loic Juillard, Ser. No. 12/636,918, filed Dec. 14, 2009:

which is a Continuation-in-Part of a pending application entitled, SYSTEM AND METHOD FOR ACCELERATED DATA UPLOADING, invented by Loic Juillard, Ser. No. 12/619,882, filed Nov. 17, 2009, now U.S. Pat. No. 8,140,647. Both these applications are incorporated herein by reference.

BACKGROUND OF THE INVENTION

1. Field of the Invention

This invention generally relates to digital information communication and storage, and more particularly to a system and method for deferring the downloading of data to a client from a network-connected remote service provider.

2. Description of the Related Art

As noted in Wikipedia, a proxy server is a server (a computer system executing an application program) that acts as an intermediary for requests from clients seeking resources from other servers. A client connects to the proxy server, requesting some service, such as a file, connection, web page, or other resource, available from a different server. The proxy server evaluates the request according to its filtering rules. For example, it may filter traffic by IP address or protocol. If the request is validated by the filter, the proxy provides the resource by connecting to the relevant server and requesting the service on behalf of the client. A proxy server may optionally alter the client's request or the server's response, and sometimes it may serve the request without contacting the specified server. In this case, it 'caches' responses from the remote server, and returns subsequent requests for the same content directly.

A proxy server may be used to speed up access to resources through caching. For example, web proxies are commonly used to cache web pages from a web server. A proxy server can be placed in the user's local computer or at various points between the user and the destination servers on the Internet. A caching proxy server accelerates service requests by retrieving content saved from a previous request made by the same client or even other clients. Caching proxies keep local copies of frequently requested resources, allowing large organizations to significantly reduce their upstream bandwidth usage and cost, while significantly increasing performance. Most ISPs and large businesses have a caching proxy.

A proxy that focuses on World Wide Web traffic is called a "web proxy". The most common use of a web proxy is to serve as a web cache. Most proxy programs provide a means to deny access to URLs specified in a blacklist, thus providing content filtering. This is often used in a corporate, educational or library environment, and anywhere else where content filtering is desired. Some web proxies reformat web pages for a specific purpose or audience, such as for cell phones and PDAs.

Conventionally, most systems use rudimentary shared access to download or upload data on behalf of a third party. Typically, a remote service must know the user's credentials prior to connect to an on-line storage system on behalf of the user. The problem is that the user must communicate the credentials to the remote service before, or at some point during the transaction. Since these credentials are stored for future use, and may be used in multiple transactions, they can becomes "stolen", subjecting the user to unknown liabilities.

It would be advantageous if large data downloads from remote service devices could be deferred, by temporarily storing the data in an on-line storage device.

SUMMARY OF THE INVENTION

Disclosed herein are a system and method that, upon reception of a data transfer request by a third party client, asynchronously schedules the transfer of data from a remote service into an on-line storage device. The invention provides the high speed transfer of a large amount of data without saturating the customer's network access. For example, an individual (from home) may subscribe to a HD video movie rental service. As the individual's Internet access available bandwidth does not permit the real-time streaming of the movie, the invention permits them to select the movie and view it at a later date. The system and method provide the means necessary to originate the transfer request from a client and transfer data to an on-line storage application, which is typically hosted on a faster network than the originator (client).

Accordingly, a method is provided for downloading data to a client device by deferral to an on-line storage device. Using this method, a client device sends a login request to a network-connected remote service device, and receives a remote service identification (ID) from the remote service device. Then, the client device sends a token request message, with the remote service ID, to a network-connected on-line storage device, and receives a first token identification (ID) associated with a first session and an on-line storage ID from the on-line storage device. The client device sends an upload request message to the remote service device. The upload request message includes the first token ID and on-line storage ID, and identifies a first file to be uploaded to the on-line storage device. Subsequent to the on-line storage device receiving the first file from the remote service device, the client device downloads the first file from the on-line storage device.

In one aspect, the client device downloads the first file into a locally connected storage device, and receives the location of the first file in the locally connected storage device from the on-line storage device. In another aspect, the remote service device is a movie rental portal, and sending the login request additionally includes selecting a first movie for deferred download. Then, receiving the location of the first file in the locally connected storage device includes the client device logging into the movie rental portal, accessing a deferred download watch list, and in response to selecting the first movie from the list, receiving a web page from the on-line storage device, with a pointer indicating the location of the movie in the locally connected storage device.

Additional details of the above-described method, methods from the perspective of the on-line storage device and remote storage device, and associated systems are provided below.

DETAILED DESCRIPTION

As used in this application, the terms "component," "module," "system," and the like are intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
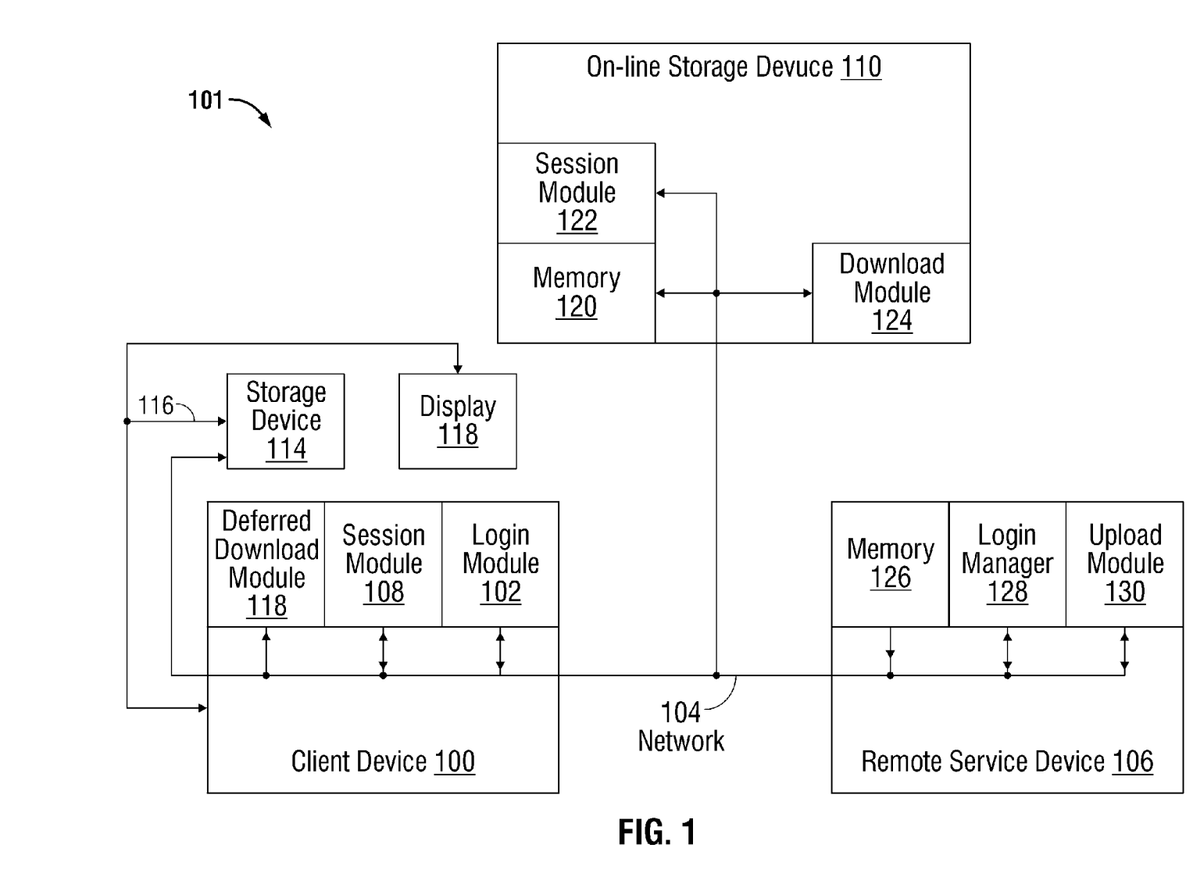
FIG. 1 is a schematic block diagram of a system for deferred data downloading to a client device.

FIG. 1 is a schematic block diagram of a system for deferred data downloading to a client device 100. The system 101 comprises a login module 102 having a network connection on line 104 for sending a login request to a remote service device 106 and for receiving a remote service identification (ID) from the remote service device. For example, the network may be a wide area network (WAN). A session module 108 has a network connection on line 104 for sending a token request message, with the remote service ID, to a network-connected on-line storage device 110. The session module 108 receives a first token identification (ID) associated with a first session and an on-line storage ID from the on-line storage device 110. A deferred download module 112 has a network connection on line 104 for sending an upload request message to the i-emote service device 106. The upload request message includes the first token ID and on-line storage ID, and identifies a first file to be uploaded to the on-line storage device 110. Typically, the deferred download module 112 additionally sends a local file system path to the first file in the remote service device 106.

It should be understood that at least the token ID, and perhaps additionally the on-line storage and remote service IDs, are dynamic credential. That is, the credential is subject to change for each particular requested file or transaction. Thus, the token ID for a second file requested by the same client, would be different that the token ID assigned to the first file. Static credentials, in contrast, are less secure, as they must be stored. Further, their reuse makes static credentials more likely to be intercepted.

A storage device 114 is locally connected to the client device 100 on line 116, and has a network connection on line 104 for receiving the first file from the on-line storage device 110, subsequent to the on-line storage device receiving the first file from the remote service device 106. For example, the storage device 114 may be connected to the client device via a local area network (LAN).

In one aspect, the deferred download module 112 receives the location of the first file in the locally connected storage device from the on-line storage device. Since the client in this case is not the direct recipient of the data sent by the remote service, the remote storage relays the data target path to the client. For example, the client need not necessarily be aware that the file being downloaded from the on-line storage device is the first file it requested from the remote service device. This is especially the case if the client is requesting numerous files from different remote services and different on-line storage devices. Thus, it may becomes necessary for the on-line storage device to notify the client of the location of a particular requested file that has been downloaded to the client's local memory.

In another aspect, the login module 102 logs into a remote service device movie rental portal 106 and selects a first movie for deferred download. That is, the first file is the first movie. The locally connected storage device 114 receives the first movie from the on-line storage device 110. The deferred download module 112 logs into the movie rental portal 106, accesses a deferred download watch list, and in response to selecting the first movie from the list, receives a web page from the on-line storage device 110, with a pointer indicating the location of the movie the locally connected storage device 114. A user interface 116, e.g., a display monitor, locally connected to the client device 100 on line 118 "plays" the first movie.

From the perspective of the on-line storage device 110, the system 101 for deferring downloads to a client device comprises a locally connected memory 120 for temporarily storing the first file. A session module 122 has a network interface on line 104 for receiving a token request message, with a remote service identification (ID), from the network-connected on-line client device 100. The on-line storage device 110 sends the first token ID associated with the first session and the on-line storage ID to the client device 100. A download module 124 has a network interface on line 104 for receiving the first file associated with the first token ID from the network-connected remote service device 106 associated with the remote service ID. The on-line storage device 110 stores the first file in the memory 120, and subsequent to client initiation, the download module 124 sends the first file to the client device 100 from memory 120.

Typically, the download module 124 downloads the first file into the storage device 114 locally connected to the client device 100, and sends the location of the first file in the locally connected storage device, to the client device 100.

FIG. 1 also depicts the system 101 for deferred data downloading to the client device 100, through the on-line storage device 110, from the perspective of the remote service device 106. In that case, the system comprises a locally connected memory 126 including the first file. A login manager 128 has a network interface on line 104 for receiving the login request from a network-connected remote client device 100, and for sending the remote service identification (ID) to the client device. An upload module 130 has a network interface on line 104 for receiving the upload request message from the client device 100. The upload request message includes the first token ID associated with the first session and the on-line storage ID. The upload request message also identifies the first file to be uploaded to a network-connected remote on-line storage device 110. In one aspect, the upload module 130 additionally receives a local file system path to the first file in the memory 126. The upload module 130 accesses the first file in memory 126, and uploads the first file, with the first token ID and on-line storage ID to the on-line storage device 110, for deferred download to the client device 100.

If the remote service device is a movie rental portal and the first file is a first movie, the login manager 128 receives a command from the client device 100 selecting the first movie selection for deferred download to the client device. Then, the upload module 130, subsequent to sending the first movie the on-line storage device, receives a command from the client device accessing a deferred download watch list. In response to the selection of the first movie from the list, the upload module 130 sends an on-line storage device URL to the client device for accessing a location of the first movie in the storage device 114 locally connected to the client device.

The upload request message, and other messages disclosed herein may be understood to including a series of handshaking signals, or a succession of signal prompts and signal responses. The system is not limited to any particular message protocol.

The devices 100, 106, and 110 may employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. For simplicity, all the memories associated with the on-line storage device are shown as one element, identified by reference designator 120, and the memories associated with the remote service device are represented by memory 126. The execution of the sequences of instructions contained in a computer-readable medium may cause a processor to perform some of the steps associated with the deferred download functions. Alternately, these functions, or some of these functions may be performed in hardware. The practical implementation of components of the system as a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

As used herein, the systems connected in the WAN network may also be referred to as remote devices. The term "remote" is not defined by geographical location or network protocol. The LAN network can be a local network or intranet connecting devices that are proximity located, in which case the client device and local accelerator may be "local" with respect to each other. In another aspect, the client device may communicate with the WAN through a modem (not shown) using an Ethernet protocol.

Elements in the WAN network may be separated by thousands of miles and communicate via the Internet, in which case the messages mentioned herein may be digitally enveloped in successive protocol layers and carried via a synchronous optical network (SONET) network. Communicating devices are not to be considered as remote or local based upon the protocol being used to support communications.

Rather, the term "remote" defines entities that have separate identities, names, or legal standing. Thus, different memory modules and servers, distributed over several states, may be local components of the on-line storage device or service provider. On the other hand, a component of the on-line storage device physically co-located with the service provider is considered to be remote from the service provider, if the on-line storage device is operated by a different legal entity. As another alternative, the on-line storage device and the remote service device may be associated with the same entity, in which case the entities are remote in the sense that they perform different functions.

Although it would be possible to build the above-described systems exclusively from hardware, some of the modules may be software applications stored in memory, and connected to a microprocessor via a data/address bus. In that case, the modules are enabled as software instructions that are executed by the microprocessor. Alternately (not shown), an operating system (OS) is used to manage the authentication module, as well as other applications (not shown), such as might be embedded in a personal computer. Likewise, client and service provider functions may be enabled by a computer system executing software instructions stored in memory.

Although only a single client, remote service device, and on-line storage device are shown in FIG. 1, it should be understood that a client device may conduct transactions with a plurality of remote service devices via an on-line storage device. Further, a client may conduct transactions with a plurality of remote service devices through a plurality of on-line service devices.

Functional Description

The system of FIG. 1 creates an authentication chain between the on-line storage and the remote service. The token generated creates a virtual binding between the user's account, the remote service, and the type/name of the file being uploaded. Unlike conventional systems, even if an external entity gets a hold of the key, they would not be able to use it in any other way than to upload a file from the remote service with the intended attributes.

Figure 2:
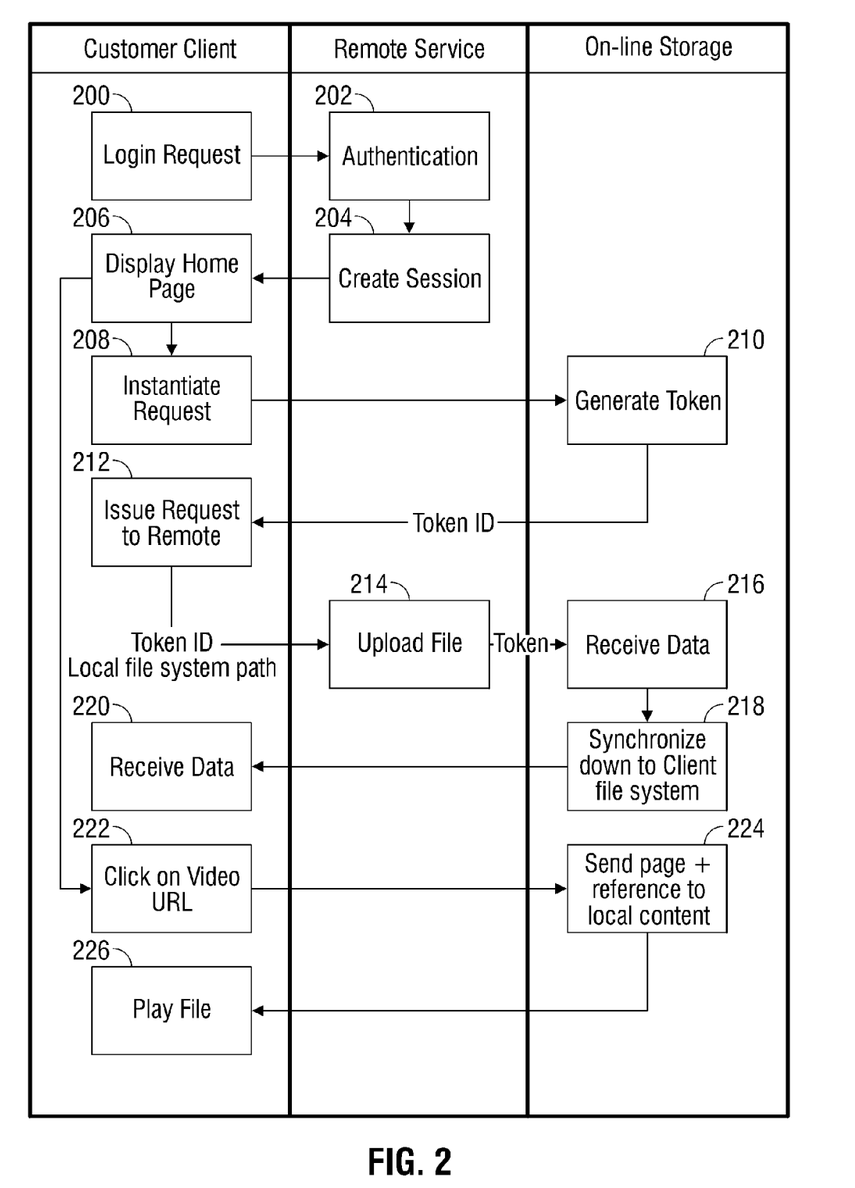
FIG. 2 is a schematic diagram depicting the use of the system of FIG. 1 for deferring the download of a high-definition (HD) movie.

FIG. 2 is a schematic diagram depicting the use of the system of FIG. 1 for deferring the download of a high-definition (HD) movie. For example, a home Internet customer is accessing an HD movie on a movie rental website. Their house Internet access is provided through a DSL line (or cable modem) and therefore has a limited download bandwidth of 3 megabits per second (Mb/s). The 2-hour HD movie file amounts to a total of 8 gigabits (Gb) of data or about 6 hours of transfer time.

In Steps 200 through 206 the client logins into the movie rental portal (remote service), and selects an HD movie with a "watch tomorrow" feature (deferred download). In Steps 208-212 the client connects to on-line storage service with an on-line service descriptor and receives back a token ID from the on-line storage. In Step 214 the client connects to remote service with the token ID and remote storage ID along with a local file system destination path. The client may or may not turn off their PC at this point. In Step 216 the remote service uploads the movie to the on-line storage. In Steps 218-220 the client turns their PC back on, and receives the movie from the on-line storage. In Steps 222-224 the client logs back into the movie rental portal, and clicks on the Watch list Video URL. In Step 226 the movie rental remote service returns a web page with the video player pointing to the movie's location in the client's local hard drive (instead of a remote location), and the movie plays.

More generally, the above-described system becomes more critical with the development of cloud services and the growth of content data storage volume. Digital media particularly benefits from the system. With the adoption of high definition technologies both for pictures and movies, the size of files is likely to increase exponentially in the next few years. It is conceptually impossible for Internet service providers to scale their access network at the same rate of growth.

The system typically presupposes that a customer client has subscribed to an on-line backup of their personal data. The on-line backup service, remote service, and client are all aware of the deferred download protocol. In one aspect, the on-line backup service and client system maintain the data in constant synchronization.

Figure 3:
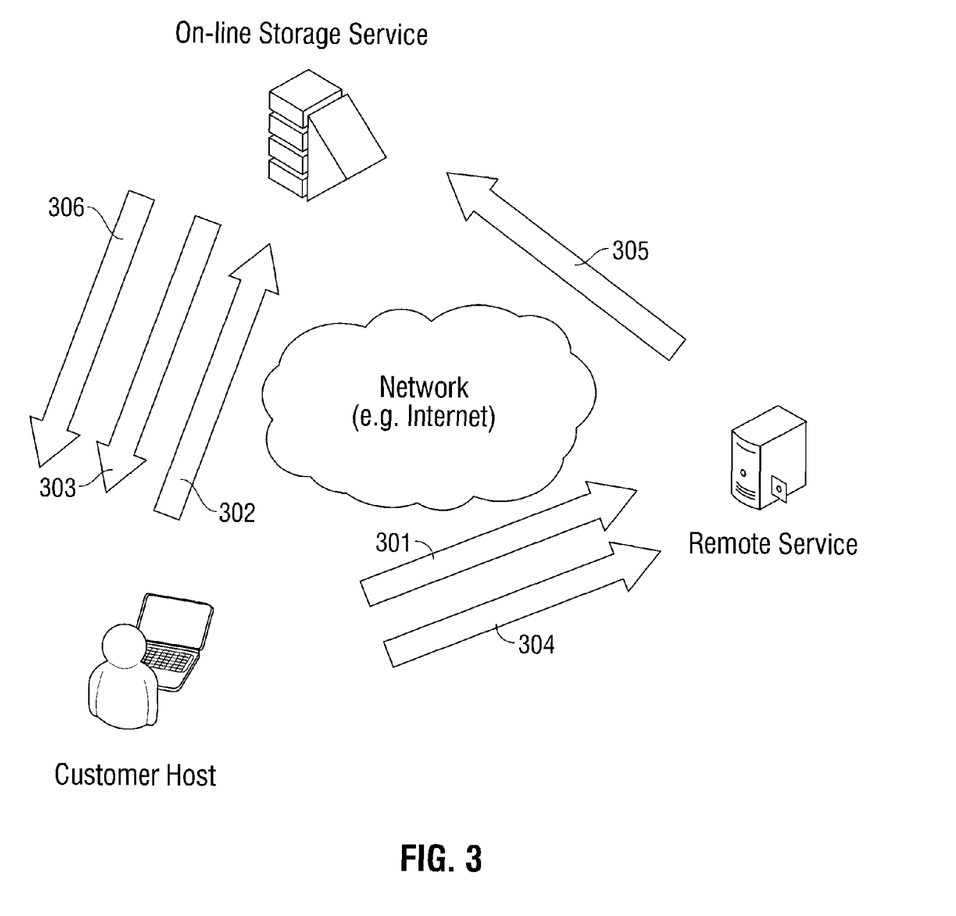
FIG. 3 is a schematic diagram depicting a process for deferred data downloading to a client device.

FIG. 3 is a schematic diagram depicting a process for deferred data downloading to a client device. The remote service is typically an on-line service (Internet or private) providing a service pertaining to the data being uploaded (such as picture printing). The customer is the user or system attempting to upload content (an Internet home user for example). The software used to access to the remote service is called a "client". The on-line storage is the network-connected entity storing a copy of the user's files.

In Step 301 the customer logs into the remote service. In Step 302 the customer sends a data access request to the on-line storage service. A token is returned to the customer in Step 303. In Step 304 the customer sends the token information to the remote service. In Step 305 the remote service contacts the on-line storage and transfers the file. In Step 306 the on-line storage service starts synchronization with the client as part of the on-line storage service. Once the transfer is completed, the on-line storage service notifies the customer that the task has been completed. The customer can access the file locally from their home storage system (local hard drive, NAS, etc.). Optionally, if the file is a movie, the remote service can create a web page with the content player (e.g., video or picture) pointing to the user's local file system either in a new page or by re-writing the link reference from the original request page. Note: the user can repeat the same process for several movies at once. The service concurrently or sequentially downloads the content.

Figure 4:
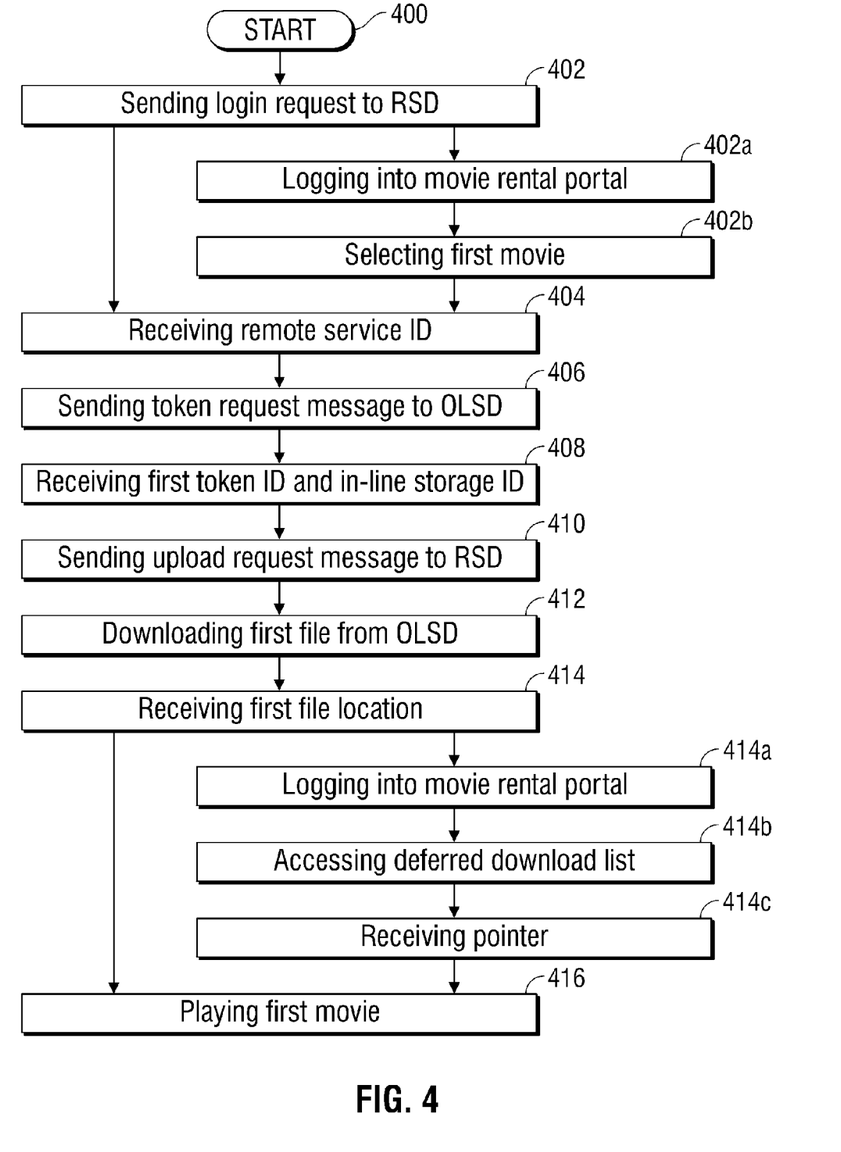
FIG. 4 is a flowchart illustrating a method for downloading data to a client device by deferral to an on-line storage device, from the perspective of the client.

FIG. 4 is a flowchart illustrating a method for downloading data to a client device by deferral to an on-line storage device, from the perspective of the client. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method comprises the client device performing the following steps, beginning at Step 400.

Step 402 sends a login request to a network-connected remote service device. Step 404 receives a remote service identification (ID) from the remote service device (RSD). Step 406 sends a token request message, with the remote service ID, to a network-connected on-line storage device (OLSD). Step 408 receives a first token identification (ID) associated with a first session and an on-line storage ID from the on-line storage device. Step 410 sends an upload request message to the remote service device. The upload request message includes the first token ID and on-line storage ID, and identifies a first file to be uploaded to the on-line storage device. In one aspect, the upload request message additionally includes a local file system path to the first file in the remote service device. Subsequent to the on-line storage device receiving the first file from the remote service device, the client device downloads the first file from the on-line storage device in Step 412.

In one aspect, downloading the first file from the on-line storage device in Step 412 includes the client device downloading the first file into a locally connected storage device. Then in Step 414 the client device receives the location of the first file in the locally connected storage device from the on-line storage device.

In another aspect, sending the login request to the remote service device in Step 402 includes substeps. Step 402a logs into a movie rental portal and Step 402b selects a first movie for deferred download. Downloading the first file from the on-line storage device in Step 412 includes downloading the first movie from the on-line storage device into the locally connected storage device. Then, receiving the location of the first file in the locally connected storage device in Step 414 includes substeps. In Step 414a the client device logs into the movie rental portal. In Step 414b the client device accesses a deferred download watch list. In response to selecting the first movie from the list, client device receives a web page from the on-line storage device in Step 414c, with a pointer indicating the location of the movie in the locally connected storage device. In Step 416 the first movie plays on a user interface locally connected to the client device.

Figure 5:
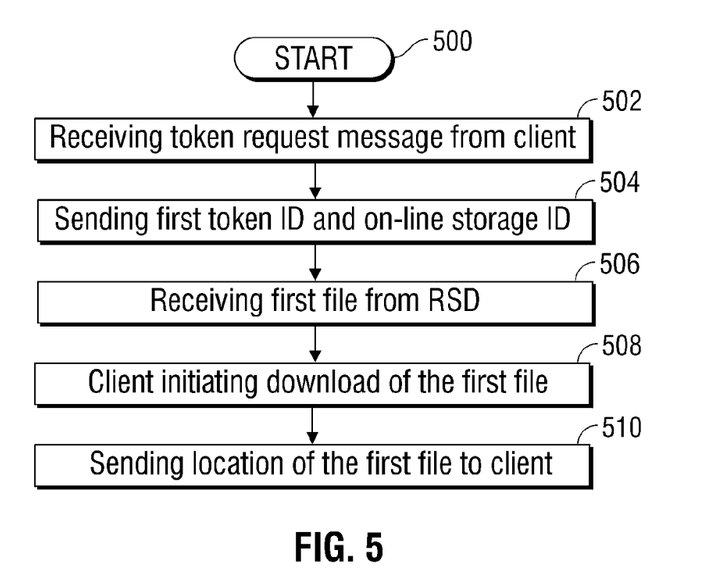
FIG. 5 is a flowchart illustrating a method for downloading data to a client device by deferral to an on-line storage device, from the perspective of the on-line storage device.

FIG. 5 is a flowchart illustrating a method for downloading data to a client device by deferral to an on-line storage device, from the perspective of the on-line storage device. The method comprises steps performed by the on-line storage device, beginning at Step 500.

Step 502 receives a token request message, with a remote service identification (ID), from a network-connected on-line client device. Step 504 sends a first token ID associated with a first session and an on-line storage ID to the client device. Step 506 receives a first file associated with the first token ID from a network-connected remote service device associated with the remote service ID. In Step 508 the client initiates the downloading of the first file from the on-line storage device.

In one aspect, downloading the first file to the client device in Step 508 includes downloading the first file into a storage device locally connected to the client device, and a further step, Step 510 sends the location of the first file in the locally connected storage device to the client device.

Figure 6:
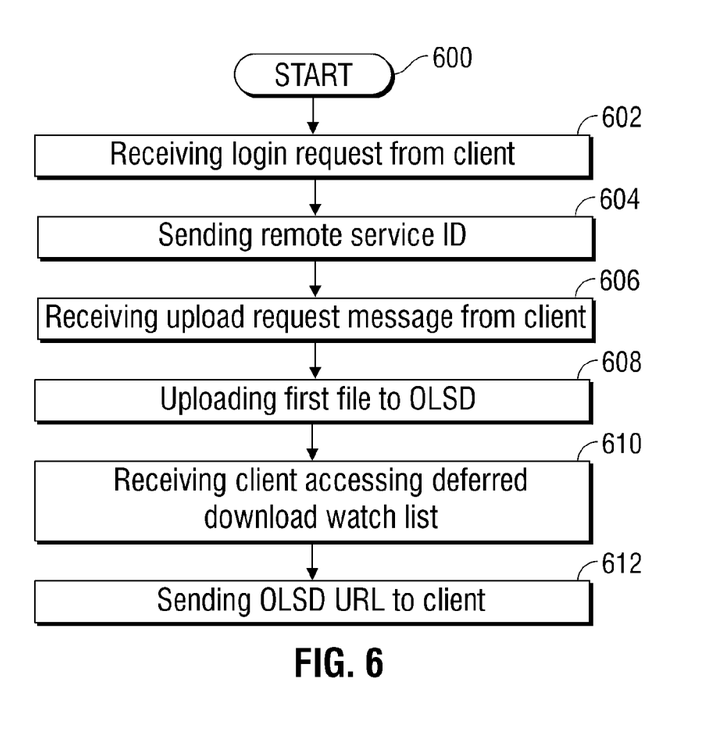
FIG. 6 is a flowchart illustrating a method for downloading data to a client device by deferral to an on-line storage device, from the perspective of the remote service device.

FIG. 6 is a flowchart illustrating a method for downloading data to a client device by deferral to an on-line storage device, from the perspective of the remote service device. The method comprises steps performed by a remote service device, beginning with Step 600.

Step 602 receives a login request from a network-connected remote client device. Step 604 sends a remote service identification (ID) to the client device. Step 606 receives an upload request message from the client device. The upload request message includes a first token ID associated with a first session and an on-line storage ID, and it identifies a first file to be uploaded to a network-connected remote on-line storage device. In one aspect the upload request message additionally includes a local file system path to the first file in the remote service device. Step 608 uploads the first file, with the first token ID and on-line storage ID to the on-line storage device, for deferred download to the client device.

In one aspect, receiving the login request from the client device in Step 602 includes a movie rental remote service device receiving a movie selection for deferred download to the client device. Subsequent to sending the movie the on-line storage device in Step 608, Step 610 receives a client device login to the movie rental portal, accessing a deferred download watch list. In response to the selection of the first movie from the list, Step 612 sends an on-line storage device URL to the client device for accessing a location of the movie in a storage device locally connected to the client device.

A system and method have been provided for deferred data downloading to a client from a remote service device. Some examples of specific communication algorithms have been given to illustrate the invention. However, the invention is not limited to merely these examples. Other variations and embodiments of the invention will occur to those skilled in the art.

I claim:

1. A method for downloading data to a client device by deferral to an on-line storage device, the method comprising the client device:
   receiving a remote service identification (ID) from a network connected remote service device in response to sending a login request;
   sending a token request message, with the remote service ID, to a network-connected on-line storage device;
   receiving a first token identification (ID), associated with the token request message, and an on-line storage ID from the on-line storage device;
   sending an upload request message to the remote service device, the upload request message comprising the first token ID and the on-line storage ID received from the on-line storage device; and,
   subsequent to the on-line storage device receiving a first file associated with the first token ID from the remote service device, downloading the first file from the on-line storage device.

2. The method of claim 1 wherein sending the upload request message to the remote service device comprises sending a local file system path to the first file in the remote service device.

3. The method of claim 1 wherein downloading the first file from the on-line storage device comprises downloading the first file into a locally connected storage device; and,
   the method further comprising:
   receiving the location of the first file in the locally connected storage device from the on-line storage device.

4. The method of claim 3 wherein sending the login request to the remote service device comprises:
   logging into a movie rental portal; and,
   selecting a first movie for deferred download;
   wherein downloading the first file from the on-line storage device comprises downloading the first movie from the on-line storage device into the locally connected storage device;
   wherein receiving the location of the first file in the locally connected storage device includes:
   logging into the movie rental portal;
   accessing a deferred download watch list;
   in response to selecting the first movie from the list, receiving a web page from the on-line storage device, with a pointer indicating the location of the movie in the locally connected storage device; and,
   the method further comprising:
   the first movie playing on a user interface locally connected to the client device.

5. A method for downloading data to a client device by deferral to an on-line storage device, the method comprising the on-line storage device:
   receiving a token request message, with a remote service identification (ID), from a network-connected on-line client device;
   sending a first token ID, associated with the token request message, and an on-line storage ID to the client device;
   receiving a first file associated with the first token ID from a network-connected remote service device associated with the remote service ID; and,
   sending the first file received from the network-connected remote service device to the client device in response to a download request from the client device.

6. The method of claim 5 wherein downloading the first file to the client device comprises downloading the first file into a storage device locally connected to the client device; and,
   the method further comprising:
   sending the location of the first file in the locally connected storage device to the client device.

7. A method for downloading data to a client device by deferral to an on-line storage device, the method comprising a remote service device:
   receiving a login request from a network-connected remote client device;
   sending a remote service identification (ID) to the client device;
   receiving an upload request message from the client device, the upload request message comprising a first token ID, associated with the remote service ID, and an on-line storage ID generated by a network-connected remote on-line storage device; and,
   uploading a first file associated with the first token ID and the on-line storage ID to the on-line storage device for deferred download to the client device.

8. The method of claim 7 wherein receiving the upload request message comprises receiving a local file system path to the first file in the remote service device.

9. The method of claim 7 wherein receiving the login request from the client device comprises a movie rental remote service device receiving a movie selection for deferred download to the client device;
   the method further comprising:
   subsequent to sending the movie the on-line storage device, accepting a client device login to the movie rental portal, accessing a deferred download watch list; and,
   in response to the selection of the first movie from the list, sending an on-line storage device URL to the client device for accessing a location of the movie in a storage device locally connected to the client device.

10. A system for deferred data downloading to a client device, the system comprising:
    a memory storing computer executable modules;
    a processor configured to execute the following computer executable modules stored in the memory:
    a login module configured to send a login request to a remote service device and receive a remote service identification (ID) from the remote service device;
    a session module configured to send a token request message, with the remote service ID, to a network-connected on-line storage device, and receive a first token identification (ID), associated with the token request message, and an on-line storage ID from the on-line storage device; and
    a deferred download module configured to send an upload request message to the remote service device, the upload request message comprising the first token ID and the on-line storage ID received from the on-line storage device; and,
    a storage device locally connected to the client device and configured to receive a first file associated with the first token ID from the on-line storage device, subsequent to the on-line storage device receiving the first file from the remote service device.

11. The system of claim 10 wherein the deferred download module additionally sends a local file system path to the first file in the remote service device.

12. The system of claim 10 wherein the deferred download module receives the location of the first file in the locally connected storage device from the on-line storage device.

13. The system of claim 12 wherein the login module logs into a remote service device movie rental portal and selects a first movie for deferred download;
wherein the locally connected storage device receives the first movie from the on-line storage device;
wherein the deferred download module logs into the movie rental portal, accesses a deferred download watch list, and in response to selecting the first movie from the list, receives a web page from the on-line storage device, with a pointer indicating the location of the first movie the locally connected storage device; and,
the system further comprising:
a user interface locally connected to the client device for playing the first movie.

14. An on-line storage device system for deferring downloads to a client device, the system comprising:
a locally connected memory;
a memory storing computer executable modules; and
a processor configured to execute the following computer executable modules stored in the memory:
a session module configured to receive a token request message, with a remote service identification (ID), from a network-connected on-line client device, and send a first token ID, associated with the token request message, and an on-line storage ID to the client device; and,
a download module configured to receive a first file associated with the first token ID from a network-connected remote service device associated with the remote service ID, store the first file in the locally connected memory, and subsequent to client initiation, send the first file to the client device.

15. The system of claim 14 wherein the download module downloads the first file into a storage device locally connected to the client device, and sends the location of the first file in the locally connected storage device, to the client device.

16. A remote service device system for deferred data downloading to a client device through an on-line storage device, the system comprising:
a locally connected memory comprising a first file;
a memory storing computer executable modules; and
a processor configured to execute the following computer executable modules stored in the memory:
a login manager module configured to receive a login request from a network-connected remote client device, and send a remote service identification (ID) to the client device; and
an upload module configured to receive an upload request message from the client device, the upload request message comprising a first token ID, associated with the remote service ID, and an on-line storage ID generated by a network-connected remote on-line storage device, access the first file in the locally connected memory, and upload the first file associated with the first token ID and the on-line storage ID to the on-line storage device for deferred download to the client device.

17. The system of claim 16 wherein the upload module is further configured to receive a local file system path to the first file in the locally connected memory.

18. The system of claim 16 wherein the first file in the locally connected memory is a first movie;
wherein the login manager module receives a command from the client device selecting the first movie selection for deferred download to the client device; and,
wherein the upload module, subsequent to sending the first movie the on-line storage device, receives a command from the client device accessing a deferred download watch list, and in response to the selection of the first movie from the list, the upload module sends an on-line storage device URL to the client device for accessing a location of the first movie in a storage device locally connected to the client device.

19. The method of claim 1 wherein the first token ID is a unique token assigned to the first file.

20. The method of claim 1 further comprising:
receiving a second token ID associated with a different token request message from the on-line storage device; and
sending the second token ID received from the on-line storage device to the remote service device.

* * * * *